Feb. 25, 1969    M. W. BEARDSLEY    3,429,395
AIR-CUSHION VEHICLE WITH FLEXIBLE SKIRT
Filed Feb. 3, 1966    Sheet 1 of 2
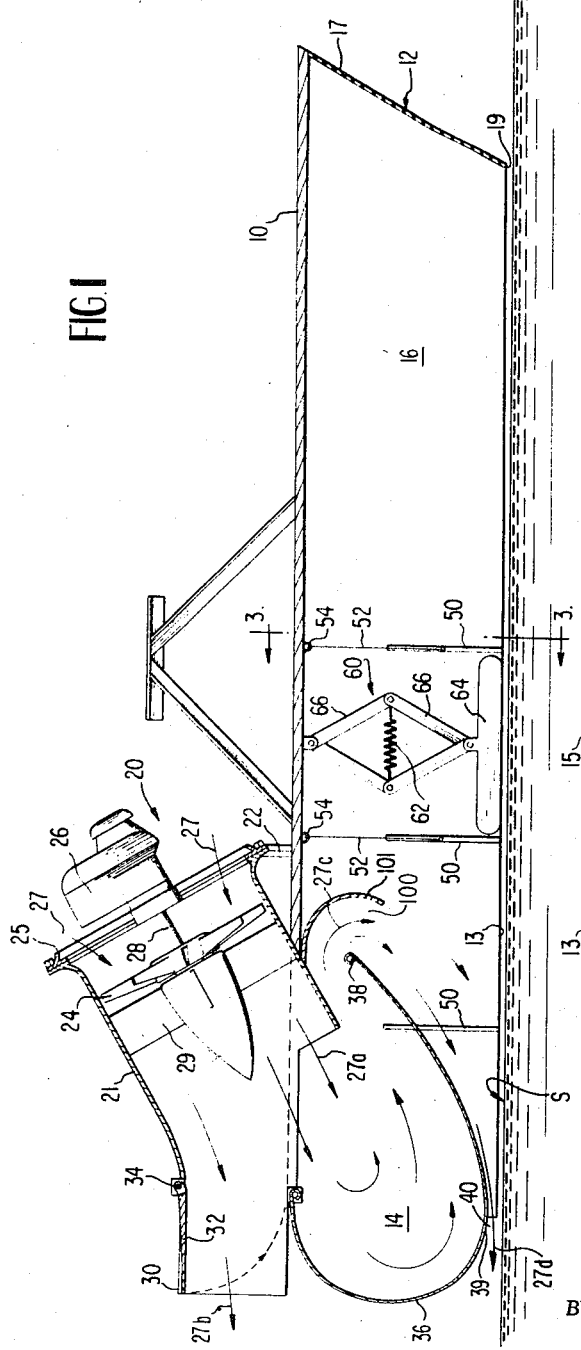
INVENTOR
MELVILLE W. BEARDSLEY
BY Browne, Schuyler & Beveridge
ATTORNEYS

INVENTOR
MELVILLE W. BEARDSLEY

BY Browne, Schuyler & Beveridge
ATTORNEYS

United States Patent Office 3,429,395
Patented Feb. 25, 1969

3,429,395
AIR-CUSHION VEHICLE WITH FLEXIBLE SKIRT
Melville W. Beardsley, 40 Windward Drive,
Severna Park, Md. 21146
Filed Feb. 3, 1966, Ser. No. 524,764
U.S. Cl. 180—117         12 Claims
Int. Cl. B60v 1/00, 1/16

ABSTRACT OF THE DISCLOSURE

An air-cushion vehicle including a flexible skirt depending downwardly from the vehicle deck to define front and rear plenum chambers. For propelling the vehicle as well as supplying air to the plenum chambers, a fan and duct system is installed on the deck. The rear plenum is formed in part by a flexible rear skirt which extends downwardly at the rear of the vehicle then inwardly under the vehicle and finally upwardly towards the deck with the lowermost portion of the rear skirt being spaced slightly above the lower edges of the skirt portions on opposite sides of the vehicle. In use the skirt portions on opposite sides of the vehicle are held down in generally vertical disposition by a constraining mechanism including a biasing spring.

---

This invention relates to a new and improved air-cushion vehicle of the type which derives its lift from an underlying body of pressurized air and propulsion from rearward flow of air.

In general, such air-cushion vehicles are constructed with a flexible-wall enclosure for a space, or plenum, beneath the main structure. This space contains air at a greater-than-atmospheric pressure which acts upwardly on the bottom of the main structure to support and lift the vehicle.

This flexible wall, often referred to as a skirt, has a twofold function: (1) to maintain the main structure at a certain height above the ground or water surface to prevent contact therewith, and (2) to minimize leakage of pressurized air from the plenum by virtue of its ability to flexibly conform to ground or water surface irregularities and thereby minimize the size of openings through which the pressurized air might escape beneath the structure.

Current air-cushion vehicles of the plenum-chamber type employ flexible skirts which are of circular outline inherently resulting from the flexibility of the skirt, which, like a balloon, tends to take the shape of a circle in which the hoop tension is uniform throughout. This restriction to the use of skirts having only circular plan form places an undesirable limitation on the design and performance of air-cushion vehicles of the plenum-chamber type.

Another limitation in current air-cushion vehicles, except for very small vehicles, is that they employ two blowing systems, one to provide air for the air-cushion which lifts the vehicle, and another to provide air flow for propulsion. While this might be considered a functionally satisfactory arrangement in view of the fact that the air flow pressures and volumes required for the two stated purposes are quite different, the requirement for two blowing systems significantly increases cost and weight of the vehicle.

It is therefore a major object of the present invention to provide a novel air-cushion vehicle which overcomes the above noted limitations of prior and current air-cushion vehicles and is highly susceptible to comparatively low cost manufacture and low maintenance while providing improved performance.

Another object of the present invention is to provide an air-cushion vehicle which may be made with an improved non-circular peripheral shape and moreover is operable with reduced drag and air leakage and with maximum thrust consistent with adequate lift.

A further object of the present invention is to provide in an air-cushion vehicle, an air blowing system which provides air for both thrust and lift.

Another object of the present invention is to provide such an air blowing system which is of reduced complexity and weight and yet is highly effective in proportioning air flow for lift and thrust purposes.

A still further object of the present invention is to provide in an air-cushion vehicle, a new and improved skirt which has the requirement of flexibility and yet may be shaped to impart an improved non-circular shape to the vehicle.

Other objects and advantages will become readily apparent from the following description in conjunction with the annexed drawings in which:

FIG. 1 is a partial cross-sectional view along the longitudinal center line of a vehicle embodying the present invention;

FIG. 2 is a fragmental bottom view of the vehicle shown in FIG. 1;

Figure 3:
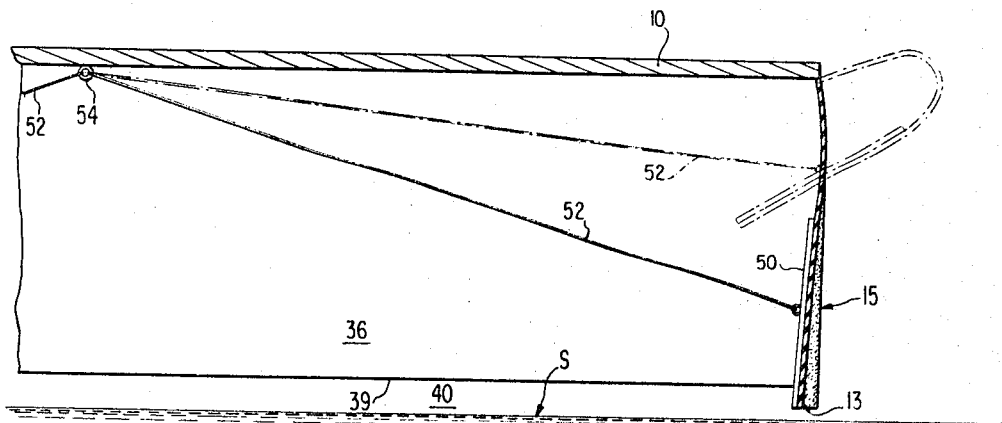
FIG. 3 is an enlarged fragmental cross-sectional view taken generally along lines 3—3 of FIG. 1.

Referring to the drawings in detail, an air-cushion vehicle embodying the present invention and being of a relatively small size adapted for water travel, is shown in FIG. 1 as basically including a deck 10, a flexible skirt 12 depending from the deck to define what will be referred to as two plenum chambers 14 and 16, and an air blowing unit generally designated 20 for supplying air to the plenum chambers for lift and for directing air rearwardly for propulsion.

Blower unit 20 includes a duct 21 and is mounted on the rear of deck 10 by a short column 22 and other braces not shown so that duct 21 extends and exhausts rearwardly and at a downward angle of approximately 30°. Installed to blow air through duct 21 is a fan 24 driven by an engine 26 to which it is connected by a shaft 28. In the described embodiment any appropriate engine may be employed such as a two cycle five horsepower engine with an 8.2 cubic inches displacement. Air discharges from duct 21 in two parts, one part discharging for lift purposes into plenum 14 in which the lower portion of duct 21 terminates, and the remainder discharging for propulsion puropses through duct 21 and an outlet or nozzle 30 on the end of duct 21, and finally into the atmosphere.

To vary and control the discharge area of nozzle 30 for purposes to be described subsequently, there is provided a nozzle control vane 32 suitably hinged in the shown embodiment on an axis 34 extending transversely across the top of duct 21 so as to be rotatable through nozzle 30 between a fully open position providing maximum nozzle area as shown in FIG. 1 and an opposite position in which it fully closes nozzle 30.

Skirt 12 extends completely around deck 10 to form with the deck and the underlying ground or water surface, plenum chambers 14 and 16. Additionally, rear plenum chamber 14 is formed by an arcuate or curved skirt portion 36 which extends from the rear of deck 10 curving downwardly and inwardly under the deck and then upwardly to an anchoring cross member 38 which is suitably fixed to and extends between opposite side portions of the skirt below the deck a distance approximately one-quarter of the depth of the vehicle. For reasons to be explained hereinafter, the lowermost level 39 of rear skirt portion 36 is designed to be spaced above the lower edges 13 of the skirt 12 as shown in FIG. 1 so as to form a rear discharge opening 40 below skirt portion 39. Skirt 12 including its curved rear portion 36, may be made from one or more pieces of any suitable flexible sheet material such as for example vinyl coated nylon fabric. However the skirt portions which include the front or what may be referred to as the main plenum chamber 16 need not be as flexible as the skirt portion 36 which encloses the rear plenum 14.

According to one aspect of the invention, the elongated non-circular shape of the skirt and vehicle is achieved and maintained through stiffener members 50 suitably attached to longitudinally spaced side portions of skirt 13. To prevent outward deflection of the side portions of skirt 12 under the pressure of the air enclosed in the plenum, tension cords 52 are fixed at one end to stiffener members 50 and at the other end to suitable fittings 54 anchored to the under surface of deck 10. This constraint is preferably designed to hold the skirt sides down and at a slightly inward angle as shown in the drawings and to establish the general alignment of the sides of the skirt 12. However, between stiffener members 50 the skirt segments 15 tend to assume an arcuate form as shown in FIG. 2 with a radius substantially equal the radius of skirt portion 17 across the bow 22 due to their tendency, when under horizontal hoop tension, to assume a uniform magnitude throughout, as previously stated. By close spacing of stiffener members 50, the sides of the skirt may be made substantially straight and flat.

It is obvious that if stiffener members 50 extended the full height of skirt 12 from the bottom skirt edge 13 to deck 10, the skirt would no longer be flexible in the vertical direction. For this reason stiffener members 50 are attached only to the lower portions of the skirt 12. With this arrangement, however, unless the upper portions of the skirt are also constrained, the sides of the skirt may be deflected, by plenum pressure and the force applied by tension members 52, into a position substantially as indicated by the dotted lines in FIG. 3. Such a result would of course render skirt 12 incapable of effectively retaining a cushion of lifting air within the plenum 16, and thereby render the vehicle *inoperative*.

This undesirable condition is prevented by a downward force applied to the skirt 12 adjacent its bottom edge 13. In the particular embodiment shown in FIGS. 1 to 3, this downward force is exerted by a four-bar parallelogram linkage 60 acting due to tension spring 62, downwardly on a rigid anchor member 64 which is suitably attached along a portion of skirt 12 adjacent to its bottom edge 13. Lower bars 66 of the linkage are pivoted at one end to anchor member 64 and at the other end to the upper bars 66 which are pivoted to the underside of deck 10 as shown in FIG. 1. A similar linkage is provided on the other side of the skirt.

In making a complete skirt for the vehicle, the bow segment 17 of skirt 12 preferably is formed of essentially semi-circular plan-form with the skirt bottom edge 19 being spaced or longitudinally aft of the upper skirt edge. With this configuration the force on the skirt bow segment 17 caused by the pressure in plenum 16 is downward as well as expandingly outward and thus the desired configuration is maintained.

Figure 4:
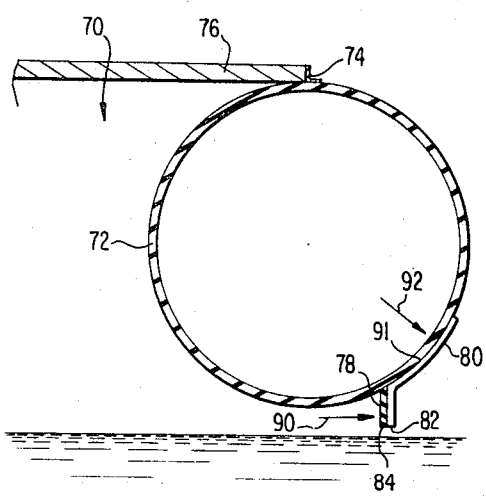
FIG. 4 is a fragmental transverse cross-sectional view of another embodiment of the invention.
Figure 5:
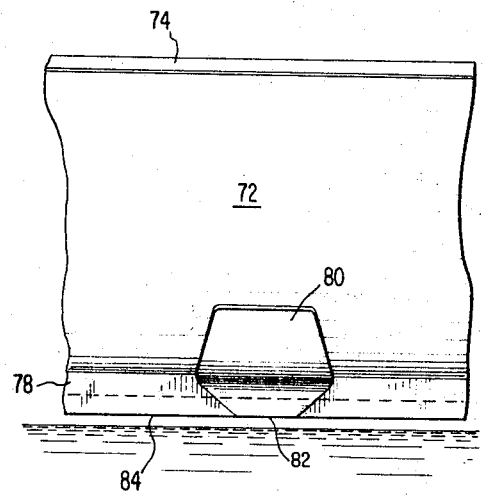
FIG. 5 is a fragmental side elevatioanl view of the embodiment shown in FIG. 4.

Maintaining the skirt at a downward and inward angle according to the invention may be achieved in other ways such as for example in the embodiment shown in FIGS. 4 and 5.

In this embodiment, the major side wall structure enclosing the plenum 70 is a flexible-walled tube 72 surrounding and attached by a suitable air-tight fitting 74 to the peripheral edge of the deck 76. A flexible skirt 78 extends along and is dependently attached to the external lower portion of tube 72, and a number of plate-like stiffeners 80 are attached to the tube 72 and dependent skirt 78 with the bottom edge 82 of the stiffeners adjacent to the skirt bottom edge 84. The flexible wall tube 72 is supplied with a greater pressure than that in plenum 70 so that the cross section of the flexible-wall tube is substantially circular as shown.

Although differing considerably in general appearance from the embodiment shown in FIG. 1, the presently described embodiment results in the provision of a downward and inward force on skirt 78 adjacent to its bottom edge 84, in accordance with the invention. Considering the forces involved, let arrow 90 represent the outward plenum pressure force on skirt 78 as transmitted to the lower portion of stiffener member 80. This force acting about fulcrum line 91 is balanced by a force, represented by arrow 92, acting on stiffener member 80 as a result of the pressure in the flexible wall tube 72.

Since the force of stiffener member 80 on skirt 78 is equal and opposite to the force of skirt 78 on the stiffener, by definition, the stiffener 80 therefore exerts an inward force on the skirt. Also, since the pressure force represented 92 on stiffener member 80 has a downward component, a downward force is transmitted to skirt 78 through stiffener 80. Thus, this embodiment is also within the spirit of the invention. Although shown in FIGS. 4 and 5 with only one flexible-wall tube 72, it will be appreciated that the invention may be employed in conjunction with several smaller tubes connected in vertical juxtaposition.

In operation, engine 26 rotates fan 24 to induct air flow into duct 21 through the inlet bell-mouth 25 as indicated by arrows 27. After passing through the fan and the flow straightening vanes 29, the air flow moves through the duct to a point where, due to the influence of local pressure conditions, it divides. Part of the air flow passes into plenum 14, as indicated by arrow 27a and the remainder takes a course leading to atmosphere through nozzle 30, as indicated by arrows 27b. This latter part of the air flow produces thrust to propel the vehicle.

The air flow entering rear plenum 14 proceeds therethrough as indicated by arrows 27c to discharge through opening 100 into the main plenum 16. Under ideal conditions this air flow then proceeds rearwardly where it discharges to the atmosphere through opening 40 between skirt portion 39 and the surface, s, over which the vehicle is travelling, as indicated by arrow 27d. To guide flow in this manner from rear plenum 14, an arcuate downwardly directed shield 101 may be fixed, if desired, across opening 100 as shown in FIGS. 1 and 2. In actual practice however some or all of the air flow entering main plenum 16 may be discharged through openings between the surface, s, and the bottom edge 13 of the skirt due to irregularities in the travelled surface, s. In operation, there is compensation for the leakage of air flow between the bottom 13 of the skirt and the underlying surface by a reduction in the area of the opening 40 under plenum 14 caused by a small downward expansion of the enclosure wall 36, 39 and/or a slight decrease in height of the main structure of the vehicle, including the blowing unit duct 21 and the plenum enclosure walls 36 and 39. This part of the air flow passing through plenums 14 and 16 provides air for the air-cushion which lifts the vehicle.

The degree of irregularity of the surface over which the vehicle is travelling, determines the amount of air flow leaking out between the bottom of the skirt 12 and the surface. To provide greater air flow to the supporting air-cushion to compensate for this increased leakage when travelling over a surface which is irregular, the nozzle control vane 32 may be deflected downward to restrict the area of nozzle 30 thereby causing a larger portion of the total air flow to be directed into the plenums 14 and 16. In extreme cases, nozzle control vane 32 may be deflected, to fully close nozzle 30 so that the entire air flow is supplied to the air-cushion in the plenums for lift.

Operation with maximum efficiency requires that the greatest possible fraction of the total air flow be employed to provide propulsion thrust and, therefore, that minimum possible air flow be expended as leakage under the bottom of the skirt 12. Through control of the area of nozzle 30 by deflection of nozzle control vane 32, a supply of lift air consistent with the irregularity of the travelled surface can be provided. However, as the vehicle moves over the surface, local variations in the degree of irregularity may occur more rapidly than nozzle control vane 32 can be adjusted. As a result, when passing over a smoother-than-average section of surface, a more-than-necessary flow of lift air is momentarily supplied to the air-cushion plenum 16. To allow for discharge of this excessive air flow there is a tendency for the vehicle to rise, giving the required increase in discharge area under the bottom of the skirt 12. This unnecessary leakage air flow is discharged in all directions and therefore does not produce forward thrust as it would if it were discharged rearwardly.

The present invention minimizes this undesirable leakage of air by making the level of skirt portion 39 above the level of the bottom 13 of the skirt. Opening 40, under the skirt portion 39 provided by this arrangement is thus actually a variable area due to the flexibility of the skirt portions 36 and 39. Therefore, when the lift air flow is momentarily greater than that required for leakage, the area of opening 40 is increased and the excess lift air flow is discharged rearwardly to produce forward thrust. Additionally, for water travel, the maintenance of a small quantity of air flow through opening 40 prevents or at least minimizes contact of water with the bottom surface of the skirt and thereby reduces drag.

Design characteristics found to provide satisfactory performance are that the area of nozzle 30 which discharges air into atmosphere for propulsion be greater than the opening 40 under the rear plenum 14 and that the maximum area of nozzle 30 be greater than half of the minimum duct area.

Although the blower installation 20 is most likely to be located adjacent to the rear of an air-cushion vehicle, as shown in FIG. 1, it may also be located in more forward positions within the concept of the invention. In such an instance the lift air flow is discharged directly into the main air-cushion plenum rather than directly into the rear plenum. However, for reasons previously given, it is usually desirable to design the skirt and plenum with a rear discharge opening such as 40 included in the described embodiment.

It will be realized by those skilled in the art that the principles of my invention can be employed in other various forms. For example, the duct may be installed in an attitude other than described, and other means of varying the proportion of the lift and propulsion air flow may also be employed. It will also be seen that the present invention, although illustrated in connection with travel over water may also be applied in connection with ground travel.

What is claimed is:

1. An air-cushion vehicle comprising in combination, a pressure reactant wall extending generally horizontally, a flexible skirt depending from said vehicle around said wall to define therewith a chamber for receiving and maintaining a body of pressurized air acting against said wall for lifting the vehicle, said skirt including opposite side portions extending along the opposite sides of the vehicle and a rear portion extending from the rear of the vehicle downwardly and inwardly under the vehicle and upwardly to a point spaced below said reactant wall to divide said chamber into front and rear plenums, the portion of said rear skirt portion extending inwardly under the vehicle being spaced above the lower edges of said side skirt portions to define an opening for expelling air from said chamber, constraining means engaging bottom portions of said opposite side portions of said skirt to limit upward and outward movement of said skirt, a first conduit communicating with said chamber, a second conduit communicating with atmosphere rearwardly of the vehicle, and air supply means for delivering air to both of said conduits for lifting and propelling the vehicle.

2. The vehicle defined in claim 1 further including a movable control member in said second conduit for proportioning the flow of air to said conduits.

3. The vehicle defined in claim 2 wherein said constraining means includes anchoring means attached to said skirt side portions and means limiting upward movement of said anchoring means, and tension members attached to said skirt side portions and fixed to the vehicle.

4. An air-cushion vehicle comprising in combination, a support wall extending generally in a horizontal plane, means depending from said wall on opposite sides thereof to define therewith a plenum chamber to be supplied with air acting on the support wall to lift the vehicle, said means including first and second skirt portions depending below the support wall on opposite sides of the vehicle, said skirt portions being made from flexible, non-molded sheet material, constraining means for yieldingly maintaining said skirt portions down away from said support wall in generally vertical planar disposition to maintain the plenum chamber and an air-cushion therein for lifting the vehicle, said constraining means including a plurality of rigid stiffener members fixed to lower portions of said skirt portions in positions spaced longitudinally of the vehicle and below said support wall, a plurality of ties anchored with respect to said support wall and respectively connected to said stiffener members for preventing lateral outward movement of said skirt portions to maintain said skirt portions in a generally vertical disposition, said contraining means further including a spring means urging lower portions of said skirt portions downwardly in spaced relation to said support wall, and an air supply means for supplying air to said plenum chamber.

5. The air-cushion vehicle defined in claim 4 wherein said ties are elongated flexible members.

6. The air-cushion vehicle defined in claim 5 wherein said spring means includes a plurality of anchoring members fixed to lower portions of said skirt portions, a linkage means anchored to said support wall at one end and having an opposite end connected to said anchoring members, and a spring urging said linkage means downwardly.

7. The air-cushion vehicle defined in claim 4 further including a rear skirt portion formed of flexible sheet material extending downwardly from the rear of the vehicle and then under the vehicle in the forward direction thereof and then upwardly toward said support wall.

8. The air-cushion vehicle defined in claim 7 wherein said rear skirt portion has a lowermost portion extending transversely across the vehicle and spaced slightly above the lowermost edges of said first and second skirt portions.

9. An air-cushion vehicle comprising in combination, a pressure reactant wall extending generally horizontally, a skirt depending from said vehicle around said wall to define therewith a chamber for receiving and maintaining a body of pressurized air acting against said wall for lifting the vehicle, said skirt including first and second opposite side portions extending along the opposite sides of the vehicle, and a rear skirt portion formed of flexible sheet material extending downwardly at the rear of the vehicle and then under the vehicle and then upwardly and forwardly to a point spaced below said reactant wall to divide said chamber into front and rear plenums, said rear skirt portion extending transversely of the vehicle between said first and second skirt portions with the latter positioned on opposite sides of said rear skirt portion, the portion of said rear skirt portion extending inwardly under the vehicle being spaced above the lower edges of said first and second skirt portions to define a first opening for expelling air from said chamber rearwardly of the vehicle, the portion of said rear skirt portion terminating adjacent said reactant wall defining therewith a second opening through which air passes from said rear plenum to said front plenum, air supply means for supplying air into said rear plenum, said rear skirt portion being substantially continuous and imperforate throughout whereby upon introduction of air into said rear plenum, said rear skirt portion billows outwardly into a convexly curved configuration with the air flowing from the rear plenum into the front plenum through said second opening.

10. The air-cushion vehicle defined in claim 9 wherein said rear skirt portion extends transversely across the underside of the vehicle in planes generally perpendicular to the planes of said first and second skirt portions.

11. The air-cushion vehicle defined in claim 9 further including constraining means acting on lower portions of said first and second skirt portions to maintain them in a generally vertical disposition below the vehicle with the lowermost edges of said first and second skirt portions spaced below the reactant wall.

12. The air-cushion vehicle defined in claim 9 wherein said rear skirt portion is fixed at one end extremity with respect to said pressure reactant wall and the opposite end extremity of said rear skirt portion is fixed with respect to said first and second side skirt portions.

References Cited

UNITED STATES PATENTS

| | | |
|---|---|---|
| 3,130,939 | 4/1964 | Alper et al. |
| 3,140,687 | 7/1964 | Beardsley. |
| 3,150,732 | 9/1964 | Walker. |
| 3,174,570 | 3/1965 | Cockerell. |
| 3,177,959 | 4/1965 | Gaska. |
| 3,258,080 | 6/1966 | Williams et al. |
| 3,273,663 | 9/1966 | Cockerell. |
| 3,275,270 | 9/1966 | Earl et al. |
| 3,291,237 | 12/1966 | Hopkins et al. 180—127 |
| 3,291,239 | 12/1966 | Eggington et al. 180—128 |
| 3,291,240 | 12/1966 | Driver 180—128 |
| 3,318,404 | 5/1967 | Hopkins et al. 180—128 X |

A. HARRY LEVY, *Primary Examiner.*

U.S. Cl. X.R.

180—124, 127